US012689434B2

(12) United States Patent
Malecha

(10) Patent No.: US 12,689,434 B2
(45) Date of Patent: Jul. 21, 2026

(54) COEXISTENCE MODULE FOR ACCOMMODATING OPTICAL TIME DOMAIN REFLECTOMETRY IN OPTICAL NETWORKS

(71) Applicant: CommScope Technologies LLC, Hickory, NC (US)

(72) Inventor: Jill Anne Malecha, New Prague, MN (US)

(73) Assignee: CommScope Technologies LLC, Hickory, NC (US)

( * ) Notice: Subject to any disclaimer, the term of this patent is extended or adjusted under 35 U.S.C. 154(b) by 272 days.

(21) Appl. No.: 18/708,507

(22) PCT Filed: Nov. 8, 2022

(86) PCT No.: PCT/US2022/079471
§ 371 (c)(1),
(2) Date: May 8, 2024

(87) PCT Pub. No.: WO2023/081916
PCT Pub. Date: May 11, 2023

(65) Prior Publication Data
US 2025/0023635 A1 Jan. 16, 2025

Related U.S. Application Data

(60) Provisional application No. 63/353,088, filed on Jun. 17, 2022, provisional application No. 63/277,006, filed on Nov. 8, 2021.

(51) Int. Cl.
*H04B 10/071* (2013.01)
*H04B 10/275* (2013.01)

(52) U.S. Cl.
CPC ......... *H04B 10/071* (2013.01); *H04B 10/275* (2013.01)

(58) Field of Classification Search
CPC ........................... H04B 10/071; H04B 10/275
(Continued)

(56) References Cited

U.S. PATENT DOCUMENTS

| 7,369,219 B2 * | 5/2008 | Rosolem | ............ G01M 11/3145 |
| | | | 356/73.1 |
| 7,388,657 B2 * | 6/2008 | Abbott | ................. H04B 10/071 |
| | | | 356/73.1 |

(Continued)

FOREIGN PATENT DOCUMENTS

| CN | 103499356 A | * | 1/2014 | ............. G01H 9/006 |
| CN | 110474676 A | * | 11/2019 | ........... H04B 10/071 |

(Continued)

OTHER PUBLICATIONS

International Search Report and Written Opinion for Application No. PCT/US2022/079471 mailed Mar. 13, 2023.

*Primary Examiner* — Amritbir K Sandhu
(74) *Attorney, Agent, or Firm* — Merchant & Gould P.C.

(57) ABSTRACT

A coexistence module usable at secondary locations within a routing optical network is disclosed, which accommodates OTDR testing on the optical network without requiring a separate, dedicated fiber connected between secondary locations for such testing. Rather, a filter arrangement is used in which OTDR wavelengths are separated from transmission wavelengths and optically connected to bypass router equipment at the secondary location.

33 Claims, 5 Drawing Sheets

(58) Field of Classification Search
USPC ........................................................ 398/204
See application file for complete search history.

(56) References Cited

U.S. PATENT DOCUMENTS

| | | | | |
|---|---|---|---|---|
| 9,276,673 B2 * | 3/2016 | Smith | .................. | H04B 10/073 |
| 9,312,953 B2 * | 4/2016 | Soto | .................... | H04J 14/0257 |
| 9,608,720 B2 * | 3/2017 | Smith | .................. | H04B 10/071 |
| 11,742,941 B2 * | 8/2023 | Ponchon | ............. | H04J 14/0307 |
| | | | | 398/28 |
| 2005/0271321 A1 | 12/2005 | Shimizu et al. | | |
| 2007/0086332 A1 | 4/2007 | Way et al. | | |
| 2008/0309925 A1 | 12/2008 | Abbott | | |
| 2013/0108274 A1 | 5/2013 | Zhang | | |
| 2016/0191152 A1 | 6/2016 | Soto et al. | | |

FOREIGN PATENT DOCUMENTS

| | | | | |
|---|---|---|---|---|
| KR | 20250158567 A | * | 11/2025 | ....... H04B 10/07957 |
| WO | 2017/068170 A1 | | 4/2017 | |
| WO | 2022/008546 A1 | | 1/2022 | |
| WO | 2023/158981 A1 | | 8/2023 | |

* cited by examiner

COEXISTENCE MODULE FOR ACCOMMODATING OPTICAL TIME DOMAIN REFLECTOMETRY IN OPTICAL NETWORKS

CROSS-REFERENCE TO RELATED APPLICATIONS

This application is a National Stage Application of PCT/US2022/079471, filed on Nov. 8, 2022, which claims the benefit of U.S. patent application Ser. No. 63/277,006, filed on Nov. 8, 2021 and claims the benefit of U.S. patent application Ser. No. 63/353,088, filed on Jun. 17, 2022, the disclosures of which are incorporated herein by reference in their entireties. To the extent appropriate, a claim of priority is made to each of the above disclosed applications.

BACKGROUND

Optical networks may be organized variety structures. In some examples, a ring structure may be used, in which a primary location is optically connected in sequence through a series of secondary locations, each of which may include routers that branch optical services from the ring network. Typically, at each secondary location, a fiber is optically connected to a router, which routes optical signals therethrough at predetermined wavelengths or wavelength ranges.

In many optical systems, including active and passive optical distribution networks, it is desirable to be able to test for optical conductivity across the network. For example, it may be useful to determine optical loss levels at varying locations throughout an optical distribution network, for example at each of the secondary locations.

One technique for testing optical networks for loss is through use of optical time domain reflectometry (OTDR) systems. An OTDR system will typically introduce a signal at a predetermined wavelength that is propagated along an optical network. Such a system may be connected at an optical port included within the optical network, and signals that are reflected back to that optical port, which represent overall losses within the optical network, may be captured and analyzed as a function of time (e.g. a time difference between when the optical signal is injected onto the optical network and a time at which a reflected signal is received). By analyzing the extent of reflected optical signals distributed along a time (distance) axis can allow for testing both whether significant optical losses are occurring within a network, as well as a relative distance from the OTDR testing device at which those optical losses are incurred. Accordingly, use of OTDR is convenient for purposes of easily determining location and severity of optical loss within a network while only requiring installation of testing equipment at a single location within the optical network.

In the context of an optical network having a ring structure or another structure, use of OTDR can become significantly complex. That is, because each router at a secondary location is configured to capture and forward signals within a predetermined wavelength range (with the specific wavelength or range of wavelengths being specific to the optical service being delivered on the network), typical OTDR test signals that are used will be selected to have a wavelength that is outside the operating range of typical optical devices. Accordingly, in such networks, an OTDR signal would not typically be forwarded beyond a first secondary location if that signal were injected on the fiber that is provided to the router at each secondary location. As such, in networks where OTDR testing is desirable, a separate fiber is often required to be included within the network to connect between secondary locations, and which is routed to bypass routers at such secondary locations. Use of a separate, dedicated fiber for testing is inefficient.

SUMMARY

This summary is provided to describe, briefly, aspects of the present disclosure. In general a coexistence module usable at secondary locations within a routing optical network is disclosed which accommodates OTDR testing on the optical network without requiring a separate, dedicated fiber connected between secondary locations for such testing. Rather, a filter arrangement is used in which OTDR wavelengths are separated from transmission wavelengths and optically connected to bypass router equipment at the secondary location.

In a first aspect, an optical testing coexistence module for use in an optical network is disclosed. The optical testing coexistence module includes a first wavelength division component optically connectable to an upstream optical fiber within the optical network. The first wavelength division component is configured for receipt of optical signals within a transmission wavelength range and a testing wavelength range that is outside of the transmission wavelength range. The first wavelength division component is configured for separation of the optical signals onto a transmission optical path carrying the transmission wavelength range and optically connectable to optical distribution equipment, and a bypass optical path carrying the testing wavelength range. The optical testing coexistence module further includes a second wavelength division component optically connectable to the optical distribution equipment to receive the transmission wavelength range via a transmission fiber connection from the optical distribution equipment and the testing wavelength range via the bypass path, the second wavelength division component recombining the received optical signals in the transmission wavelength range and the testing wavelength range onto a common downstream optical fiber.

In a second aspect, a method of enabling optical time domain reflectometry (OTDR) testing in an optical network including a primary cabinet location and a plurality of secondary cabinet locations optically connected in series is disclosed. Each of the plurality of secondary cabinet locations optically connected to a respective upstream optical fiber and a respective downstream optical fiber. The method includes installing, at each of the plurality of secondary cabinet locations, an optical testing coexistence module. The optical testing coexistence module includes a first wavelength division component optically connected to an upstream optical fiber within the optical network. The first wavelength division component is configured for receipt of optical signals within a transmission wavelength range and a testing wavelength range that is outside of the transmission wavelength range. The first wavelength division component is configured for separation of the optical signals onto a transmission optical path carrying the transmission wavelength range and optically connected to optical distribution equipment, and a bypass optical path carrying the testing wavelength range. The optical testing coexistence module further includes a second wavelength division component optically connected to the optical distribution equipment to receive the transmission wavelength range via a transmission fiber connection from the optical distribution equipment and the testing wavelength range via the bypass path, the second wavelength division component recombining the received optical signals in the transmission wavelength range and the testing wavelength range onto a common downstream optical fiber. The method includes injecting, at the primary cabinet location, an OTDR signal onto the single fiber, and based on reflected optical signals, identifying locations within the optical network experiencing transmission loss.

In a third aspect, an optical network is provided including a primary optical distribution location and a plurality of secondary optical distribution locations optically connected in series to the primary optical distribution location via a fiber connection structure. The structure carries optical signals in a transmission wavelength range and a testing wavelength range. One or more of the plurality of secondary optical distribution locations includes optical distribution equipment and an optical testing coexistence module. The optical testing coexistence module includes a first wavelength division component optically connected to an upstream optical fiber within the optical network. The first wavelength division component is configured for receipt of optical signals within a transmission wavelength range and a testing wavelength range that is outside of the transmission wavelength range, and separation of the optical signals onto a transmission optical path carrying the transmission wavelength range and optically connected to optical distribution equipment, and a bypass optical path carrying the testing wavelength range. The optical testing coexistence module further includes a second wavelength division component optically connected to the optical distribution equipment to receive the transmission wavelength range via a transmission fiber connection from the optical distribution equipment and the testing wavelength range via the bypass path, the second wavelength division component recombining the received optical signals in the transmission wavelength range and the testing wavelength range onto a common downstream optical fiber.

In the above noted optical testing coexistence modules, a second wavelength division component is noted. In some further aspects, an optical component can be included to allow for the introduction of a testing wavelength signal at one or more of the secondary cabinet locations in a network, that is not wavelength dependent. In some aspects, the OTDR signal can be placed on the single fiber at the primary cabinet location or at the secondary cabinet location as desired.

DETAILED DESCRIPTION

As briefly described above, embodiments of the present invention are directed to a coexistence module usable at secondary locations within a routing optical network is disclosed which accommodates OTDR testing on the optical network without requiring a separate, dedicated fiber connected between secondary locations for such testing. Rather, a filter arrangement is used in which OTDR wavelengths are separated from transmission wavelengths and optically connected to bypass router equipment at the secondary location.

The coexistence module described herein may be used in any of a variety of types of optical networks, including active and passive optical networks. The coexistence module described herein is generally usable in circumstances where OTDR-based testing is desirable, and avoids a requirement of using a separate optical fiber to carry OTDR wavelengths as compared to the fiber carrying transmission wavelengths between optical equipment installation locations.

The coexistence module, and associated optical networks in which it is used have a number of advantages relative to existing optical network and testing configurations. In particular, because there does not need to be a separate fiber optically connected between installation locations, for new installations costs of fiber routing are reduced. For existing installations in which multiple fibers are routed between optical equipment locations already, the fiber otherwise used for OTDR-based testing may instead be utilized for other purposes, thereby improving overall bandwidth available between optical equipment locations, or otherwise freeing resources for use.

Figure 1:
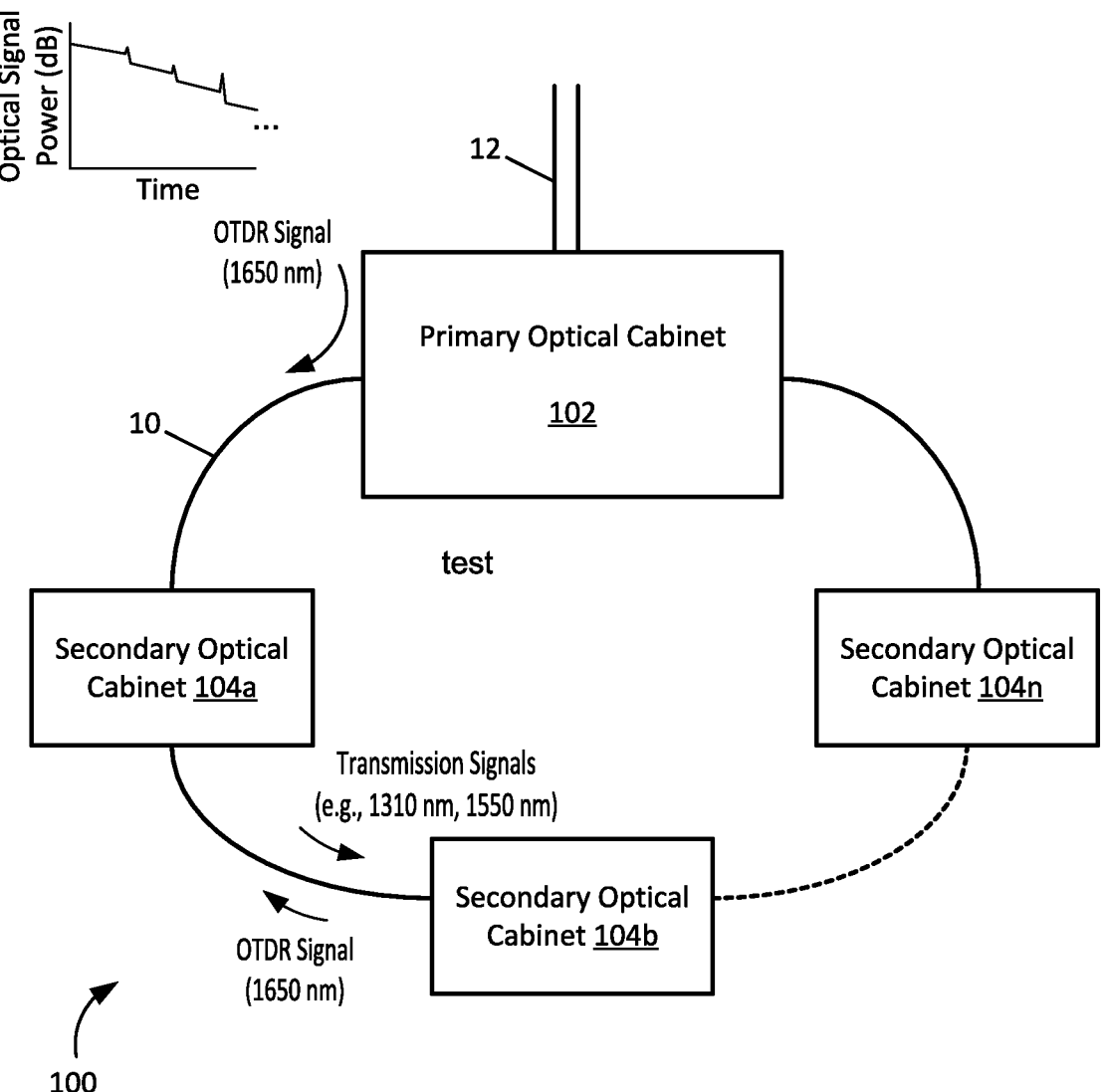
FIG. 1 illustrates an example optical rating network in which aspects of the present disclosure may be implemented.

FIG. 1 illustrates an example optical network 100 in which aspects of the present disclosure may be implemented. The optical network 100 includes a primary optical cabinet 102 and a plurality of secondary optical cabinets 104*a-n* (referred to individually as secondary optical cabinets 104). The primary optical cabinet 102 may be connected to each of the secondary optical cabinets 104*a-n* via an optical fiber cable 10. The optical fiber cable 10 may include one or more fibers usable to carry active or passive optical signals therebetween. The primary optical cabinet 102 may be further optically connected upstream via optical fibers cables 12 to additional upstream equipment, including high bandwidth optical backbone equipment. The optical network 100 of FIG. 1 is a ring network. Other optical networks can include different layouts for the primary optical cabinets 102, and the secondary optical cabinets 104*a-n*, such as in series without returning to the primary cabinet as in the ring layout.

In the particular example shown, the primary optical cabinet 102 may be optically connected to a first one of the secondary optical cabinets 104*a* via a first length of the fiber 10, and a second one of the secondary optical cabinets 104*b* may be optically connected downstream of the secondary optical cabinet 104*a* via a second length of the optical fiber cable 10, and so on. Accordingly, downstream optical fiber from the secondary optical cabinet 104*a* will be considered an upstream optical fiber from the perspective of the secondary optical cabinet 104*b*, and so on. After connecting to all of the secondary optical cabinets 104a-n, an optical fiber may be rerouted back to the primary optical cabinet 102 to complete the optical ring structure of the example network. Other optical networks may not reroute back to the primary optical cabinet 102.

Although in the example shown three secondary optical cabinets 104a, 104b, and 104n are shown, it is recognized that any number of secondary optical cabinets may be used in such a network. Additionally, each of the optical cabinets described herein may be positioned at locations spaced apart from each other, for example spaced at locations tens to hundreds of meters apart. The particular locations of primary and secondary optical cabinets are largely a function of the network to be implemented, including distribution and subscriber locations.

Figure 2:
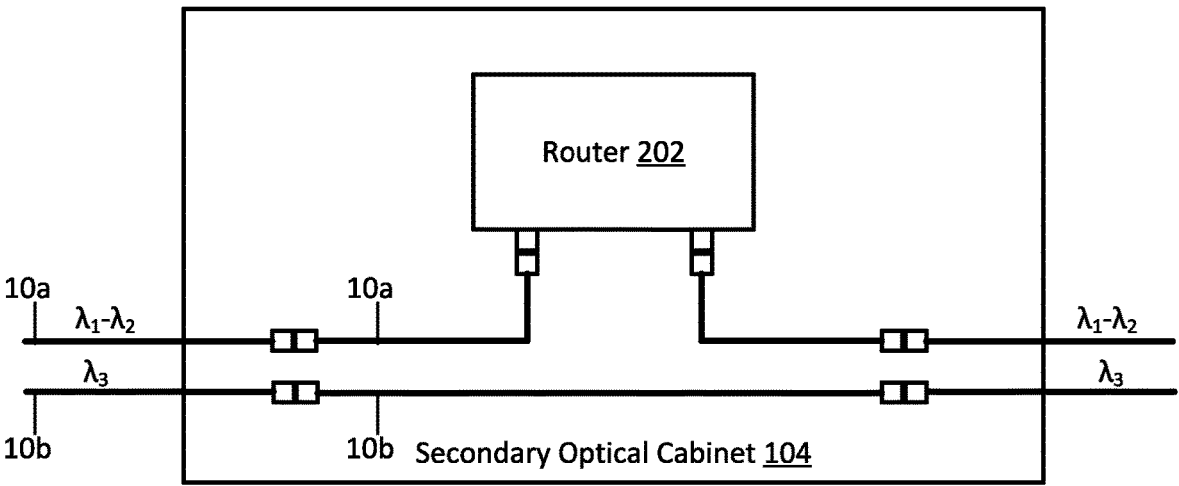
FIG. 2 is an example schematic diagram of a secondary optical cabinet in which OTDR-based optical network testing is provided.

FIG. 2 is an example schematic diagram of a secondary optical cabinet 104 in which OTDR-based optical network testing is provided. The secondary optical cabinet 104, in the example shown, represents an existing manner in which OTDR signals patent may be routed through secondary optical cabinets while avoiding routing of OTDR wavelengths to optical devices within the secondary optical cabinet 104.

In the example shown, an optical device within the secondary optical cabinet 104 can include a router 202. The router 202 is configured to be optically connected to a fiber to receive wavelengths (e.g., wavelengths $\lambda_1$, $\lambda_2$) in a wavelength spectrum that includes optical transmission wavelengths for the desired optical services to be delivered at the secondary optical cabinet 104. Example transmission wavelengths that may be used could include a 1310 nm wavelength and a 1550 nm wavelength, and as such, wavelengths in a range of 1260 nm to 1625 nm may be delivered to the router 202.

However, it is often undesirable to route optical wavelengths outside of the transmission wavelength range to the router 202. Further, due to the specific optical components within the router 202, the router may forward transmission wavelengths on an output fiber, but will not forward wavelengths outside of the transmission range. Accordingly, a separate fiber may be used for routing such optical wavelength that are outside of the transmission wavelength range. In the example shown, a separate optical fiber 10b is received at the secondary optical cabinet 104 and routed to bypass the router 202. The separate optical fiber 10b may carry a wavelength range, including a wavelength $\lambda_3$, which corresponds to a wavelength on which OTDR testing may be performed. Example test or OTDR wavelengths may be in a range above 1625 nm, for example 1650 nm.

Figure 3:
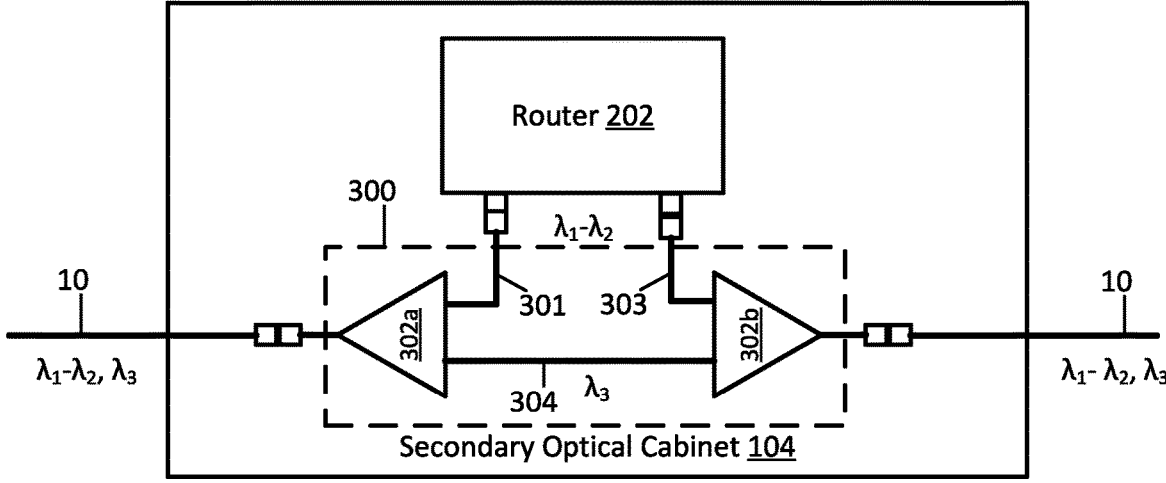
FIG. 3 is an example schematic diagram of a further secondary optical cabinet in which an optical testing coexistence module provides OTDR based optical network testing on a same fiber as transmission wavelengths are carried, in an example embodiment.

FIG. 3 is a schematic diagram of a further secondary optical cabinet 104 in which an optical testing coexistence module 300 provides OTDR based optical network testing on a same fiber as transmission wavelengths are carried, in an example embodiment.

In the example shown in FIG. 3, a single optical fiber may be provided within optical fiber cable 10, and provided to the secondary optical cabinet 104 routed to the optical testing coexistence module 300. The optical testing coexistence module 300 may include, for example, complementary wavelength division equipment 302a, 302b, included within a housing shown schematically by dashed lines. The housing can be connected quickly with optical fiber connectors, adapters, and patch cords, instead of through splicing. Although splicing can be implemented if desired.

The wavelength division equipment 302a, 302b may be wavelength division multiplexers and/or filters usable to separate optical signals received on the single fiber included in optical fiber cable 10 into separate sets of optical signals which are either forwarded to router 202, or delivered along a bypass optical path 304 within the module 300 for recombination downstream of the router 202.

In particular, optical fiber cable 10 is received at an upstream wavelength division component 302a, which splits different wavelengths or wavelength bands onto a plurality of fibers. The plurality of fibers include an upstream transmission fiber 301, which is routed to an output connector that is optically connected to router 202, as well as a bypass optical path 304 which is routed directly from the upstream wavelength division component 302a to a downstream wavelength division component 302b. The router 202 will forward the transmission wavelengths on a downstream transmission fiber 303, which is routed back to module 302 downstream wavelength division component 302b. The downstream wavelength division components 302b re-combines wavelengths onto a single fiber, for output onto optical fiber 10 downstream of the secondary optical cabinet 104.

By way of comparison to the configuration seen in FIG. 2, a separate optical fiber 10b is not required for connection between optical cabinets, and instead a single fiber may carry both the transmission wavelength range and other wavelength ranges, including a wavelength range that includes an OTDR wavelength. As above, the transmission wavelengths (e.g., including $\lambda_1$, $\lambda_2$) that may be used could include a 1310 nm wavelength and a 1550 nm wavelength, for example in the case where the optical network delivers optical network services (e.g., SONET, SDH, Ethernet). As such, in this example, wavelengths in a range of 1260 nm to 1625 nm may be delivered to the router 202. Example test or OTDR wavelengths (e.g., including $\lambda_3$) may be in a range above 1625 nm, and in some instances in a wavelength band between 1645-1655 nm, for example 1650 nm.

Figure 4:
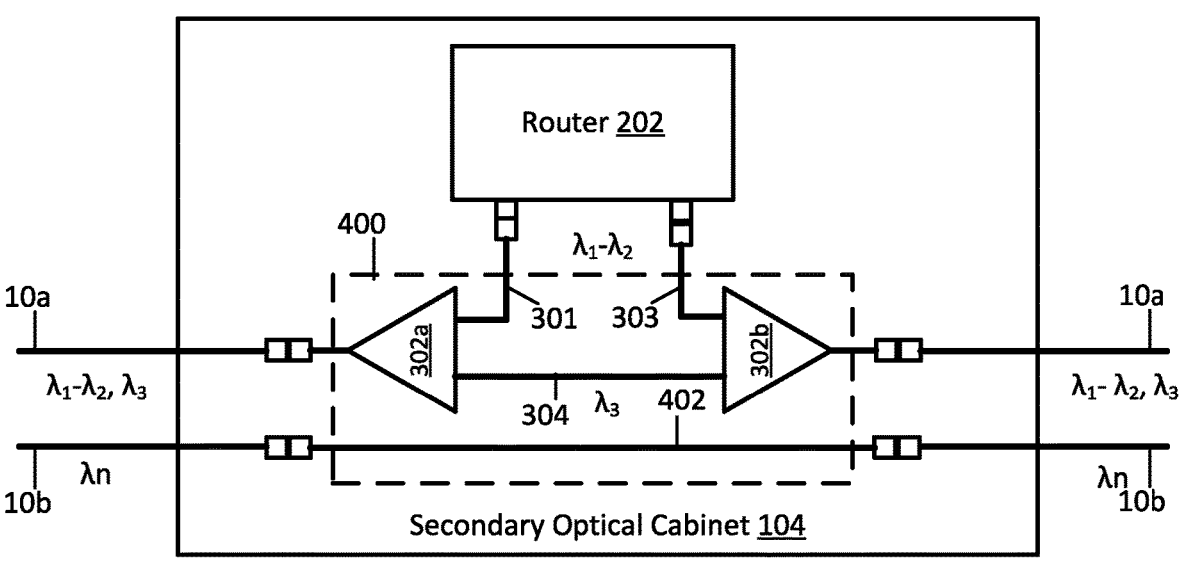
FIG. 4 is an example schematic diagram of a further secondary optical cabinet in which a second possible optical testing coexistence module provides OTDR-based optical network testing on a same fiber as transmission wavelengths are carried, in an example embodiment.

FIG. 4 is an example schematic diagram of a further version of secondary optical cabinet 104 in which a second possible optical testing coexistence module 400 provides OTDR-based optical network testing on a same fiber as transmission wavelengths are carried, in an example embodiment.

In this example, optical fibers 10a, 10b are received at the secondary optical cabinet 104, and optically connected to the optical testing coexistence module 400. Within the optical testing coexistence module 400, optical fiber 10a is routed analogously to the single optical fiber of optical fiber cable 10 of FIG. 3, with wavelengths, or wavelength bands, being separated at wavelength division component 302a, and transmission wavelengths routed to and through router 202 back to be recombined with nontransmission wavelengths (e.g. wavelength used for OTDR) and combined back onto fiber 10a at wavelength division component 302b. In this example, the second optical fiber 10b previously used, in FIG. 2 for carrying OTDR wavelengths, may be used to carry additional optical signals, for example within either an entirely different wavelength range, or within the transition wavelength band. That is, at the module 400, a further bypass optical path 402 may be formed through a housing of the module 400, and may carry (or may be repurposed to carry) optical signals other than those within the OTDR wavelengths.

In comparing the module configuration seen in FIG. 3 and FIG. 4, it is noted that the configuration seen in FIG. 3 represents an installation in which a second optical fiber need not be routed to the secondary optical cabinet 104 entirely, while FIG. 4 represents an installation in which the second optical fiber may already be routed to the secondary optical cabinet 104, in which optical fibers 10a, 10b. The arrangement in FIG. 4 may correspond to installation of a module consistent with the principles described herein into an existing optical network that already uses multiple fibers routed between optical cabinets but in which such secondary optical fibers, such as fiber 10*b*, are desired to be freed from the requirement of carrying OTDR signals, and instead may be used for other applications.

It is noted that in some embodiments in which optical fibers 10*a*, 10*b* are already routed to a secondary optical cabinet 104, the module 300 of FIG. 3 may nevertheless be used alongside a separate optical fiber or optical equipment that is connected to fiber 10*b*. Stated otherwise, second optical bypass path 402 may be within module 400, or external to module 300, if additional optical fibers are routed to the secondary optical cabinet.

Figure 5:
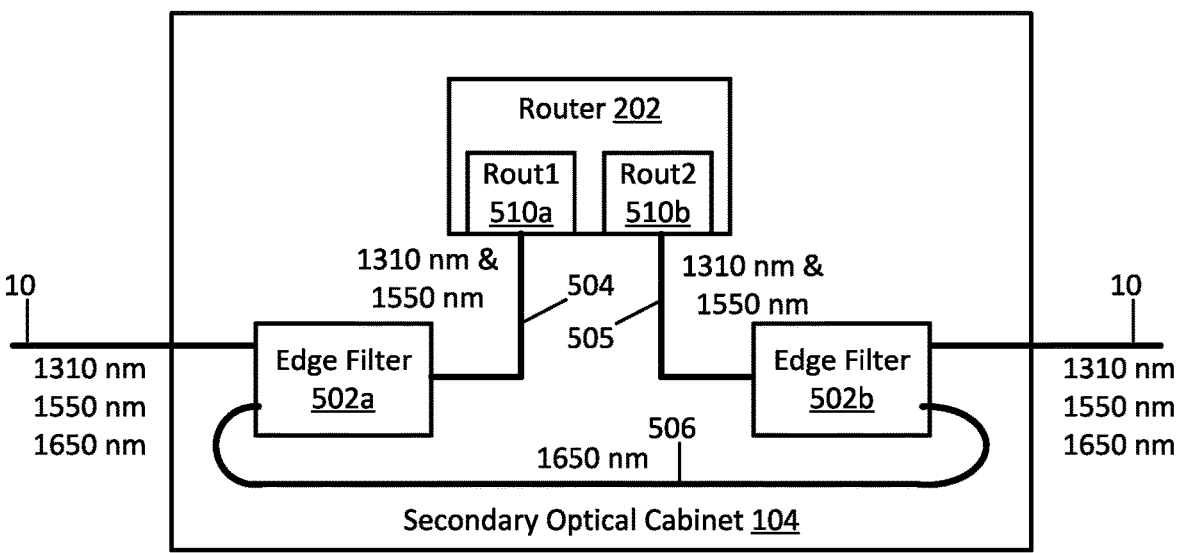
FIG. 5 is an example schematic diagram of optical components usable in an example of the optical testing coexistence modules described herein.

FIG. 5 is an example schematic diagram of optical components usable in an example of the optical testing coexistence modules described herein. The optical components seen in FIG. 5 are used within a secondary optical cabinet 104, for routing optical signals received at an optical fiber cable 10 used to interconnect such optical cabinets in a network configuration. It is noted that the optical components illustrated in FIG. 5 are usable within different configurations of an optical testing coexistence module, such as the modules 300, 400 illustrated in FIGS. 3-4.

In the example shown, optical fiber cable 10 is connected, at the secondary optical cabinet 104, to an upstream edge filter 502*a*. As illustrated, optical fiber cable 10 includes an optical fiber that carries a plurality of wavelengths within a wavelength range, or spectrum. The wavelength range includes at least transmission wavelengths and an OTDR wavelength, specifically a pair of transmission wavelengths at 1310 nm and 1550 nm, and the OTDR wavelength of 1650 nm.

The upstream edge filter 502*a* allows the transmission wavelengths (1310 nm and 1550 nm) to pass on an optical output path 504, which is routed to the router 202 at a router connection 510*a*. The upstream edge filter 502*a* as a reflect port that will reflect any wavelengths not allowed to pass on the optical output path 504, including the OTDR wavelength. The reflect port is optically connected, via a fiber 506, to a reflect port of a downstream edge filter 502*b*.

At the router 202, a downstream router connection 510*b* is optically connected to the downstream edge filter 502*b* via a downstream fiber 505. The downstream edge filter 502*b* combines the transmission optical wavelengths within the reflected, nontransmission wavelengths (including the OTDR wavelength) back onto optical fiber cable 10, which is routed out from the secondary optical cabinet 104. Accordingly, at the downstream side of the secondary optical cabinet 104, all of the transmission and nontransmission wavelengths, including the 1310 nm, 1550 nm, and 1650 nm wavelengths, are recombined onto the optical fiber cable 10.

In this example, the edge filters 502*a-b* (referred to individually as an edge filter 502) may be constructed as having optical connectors, such as SC/APC connectors used for common input, common output, and reflect ports. In a particular embodiment, from the common input to common output port, the edge filter will pass the 1310 nm and 1550 nm transmission wavelengths, due to those wavelengths being within a transmission band of 1260 to 1625 nm. Wavelengths outside of that range may be attenuated at the common output port, with an isolation of greater than 30 dB and a directivity of greater than 45 dB. In such an embodiment, another wavelength range may be routed to a reflect port, including the OTDR wavelength. Such a wavelength range may be in the 1645 to 1655 nm range, and may also have greater than 30 dB of isolation. Of course, other optical characteristics may be used as well, consistent with the principles of the present disclosure.

Referring to FIGS. 1-5 generally, it can be seen that there are a number of advantages with respect to fiber routing efficiency between optical cabinets within an optical network architecture using the modules described herein, in particular in FIGS. 3-5. Specifically, by separating OTDR wavelengths from transmission wavelengths at each optical distribution location, and in recombining those wavelengths for downstream transmission, it is possible to perform OTDR testing on an entire length of a network without requiring use of a second optical fiber that is not optically connected through routers at each optical distribution location. This can either free up an optical fiber for other uses if that fiber already exists within an optical network, or can avoid the requirement of laying such redundant fibers at a time of installation.

In particular, and referring back to FIG. 1, in a ring optical network or other optical network where modules according to the present disclosure may be used at secondary locations (e.g., secondary optical cabinets 104), and optical time domain reflectometry (OTDR) signal may be injected, for example at the primary optical cabinet 102 for transmission along the optical fiber 10, and through the secondary optical cabinets 104*a-n*. Because the OTDR signal bypasses routers at each of the secondary optical cabinets 104, the OTDR signal is able to traverse the secondary optical cabinets and propagate all the way through the optical network rather than being blocked at a first one of the secondary optical cabinets. Accordingly, without including an additional fiber for implementing OTDR testing, optical continuity between the individual secondary locations may be tested from a single testing point. By reviewing the OTDR reflected optical paragraph (an example of which is schematically depicted in FIG. 1) optical losses within the optical network may be viewed, and severity and location of such losses may be assessed. Additionally, any discontinuities in an optical service may quickly be detected as well.

Notably, in some example applications, OTDR test signals may be introduced at any convenient location within the network structure. For example, OTDR test signals may be introduced at any of the secondary optical cabinets 104*a-n*, rather than at the primary optical cabinet 102.

Figure 6A:
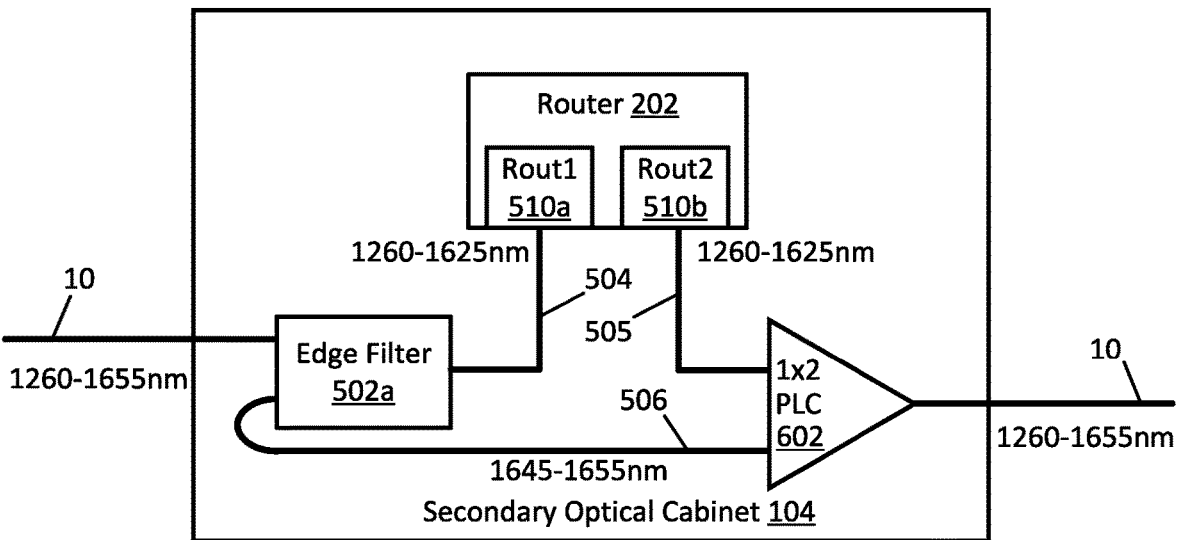
FIGS. 6A and 6B are further example schematic diagrams of optical components usable in an example of the optical testing coexistence modules described herein.
Figure 6B:
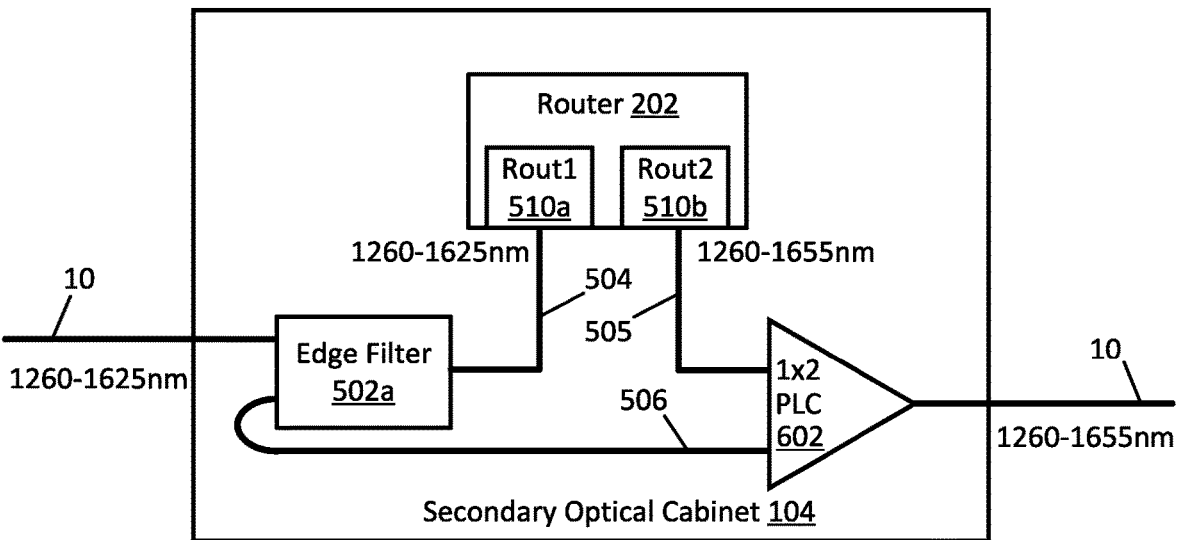

FIGS. 6A and 6B are further example schematic diagrams of optical components usable in an example of the optical testing coexistence modules described herein. FIGS. 6A and 6B show the same optical components operating under different network circumstances. The optical components seen in FIGS. 6A and 6B are used within a secondary optical cabinet 104, for routing optical signals received at an optical fiber cable 10 used to interconnect such optical cabinets in a network configuration. It is noted that the optical components illustrated in FIGS. 6A and 6B are usable within different configurations of an optical testing coexistence module, such as modules 300, 400 illustrated in FIGS. 3-4.

In the example shown in FIG. 6A, optical fiber cable 10 is connected, at the secondary optical cabinet 104, to an upstream edge filter 502*a*, like shown in FIG. 5. As illustrated, upstream optical fiber cable 10 includes an optical fiber that carries a plurality of wavelengths within a wavelength range, or spectrum. The wavelength range includes at least transmission wavelengths and an OTDR wavelength, specifically a pair of transmission wavelengths at 1310 nm and 1550 nm, and the OTDR wavelength of 1650 nm.

As with the module of FIG. 5, the upstream edge filter 502*a* allows the transmission wavelengths to pass on an optical output path 504, which is routed to the router 202 at a router connection 510a. The upstream edge filter 502a is a reflect port that will reflect any wavelengths not allowed to pass on the optical fiber path 504, including the OTDR wavelength. A reflect port is optically connected, via fiber 506 to an optical component 602 different from the edge filter 502b of FIG. 5. At the router 202, a downstream router connection 510b is optically connected to optical component 602 via the downstream fiber 505. The optical component 602 has two operational functions. In one operational function shown in FIG. 6A, optical component 602 combines the transmission optical wavelengths within the reflected, non-transmission wavelengths (including the OTDR wavelength from the primary cabinet location 102) back onto optical fiber cable 10 which is routed out from the secondary optical cabinet 104. Accordingly, in this first operational arrangement, at the downstream side of the secondary optical cabinet 104, all of the transmission and non-transmission wavelengths, including the 1310 nm, 1550 nm, and 1650 nm wavelengths, are recombined onto the optical fiber cable 10.

In a second operational arrangement shown in FIG. 6B, the OTDR signal from the primary cabinet location 102 is not provided. Instead, an OTDR signal from router 202 is desired and placed on downstream fiber 505 with the transmission optical wavelengths, and all signals pass through optical component 602 to downstream fiber 10.

Further downstream cabinets 104 can be operated like that of FIG. 6A.

With the optical testing coexistence module of FIGS. 6A and 6B, there are two options for introducing an OTDR signal, one from the primary cabinet location 102 (FIG. 6A), or, instead, from the remote router 202 (FIG. 6B).

In one example, optical component 602 is a 1×2 passive fiber optic combiner. In one more specific example, optical component 602 is a 1×2 PLC combiner.

While particular uses of the technology have been illustrated and discussed above, the disclosed technology can be used with a variety of network structures in accordance with many examples of the technology. The above discussion is not meant to suggest that the disclosed technology is only suitable for implementation with the structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. An optical testing coexistence module for use in an optical network, the optical testing coexistence module comprising:

a first optical component optically connectable to an upstream optical fiber within the optical network, the first optical component including a first wavelength division component, the first wavelength division component configured for receipt of optical signals within a transmission wavelength range and a testing wavelength range that is outside of the transmission wavelength range, and separation of the optical signals onto:

a transmission optical path carrying the transmission wavelength range and optically connectable to optical distribution equipment; and a bypass optical path carrying the testing wavelength range;

a second optical component optically connectable to the optical distribution equipment to receive the transmission wavelength range via a transmission fiber connection from the optical distribution equipment and the testing wavelength range via the bypass optical path, the second optical component recombining the received optical signals in the transmission wavelength range and the testing wavelength range onto a common downstream optical fiber.

2. The optical testing coexistence module of claim 1, further comprising a second optical fiber connection at the optical testing coexistence module forming a bypass optical path for a second optical fiber received at the optical testing coexistence module.

3. The optical testing coexistence module of claim 1, wherein the first wavelength division component comprises an edge filter.

4. The optical testing coexistence module of claim 3, wherein the second optical component comprises a second wavelength division component comprising an edge filter.

5. The optical testing coexistence module of claim 3, wherein the second optical component comprises a combiner, wherein the combiner can receive optical signals within the testing wavelength range that is outside of the transmission wavelength range from the optical distribution equipment via the transmission fiber connection or via the bypass optical path.

6. The optical testing coexistence module of claim 1, wherein the transmission wavelength range includes at least a 1310 nm wavelength and a 1550 nm wavelength.

7. The optical testing coexistence module of claim 1, wherein the transmission wavelength range includes wavelengths between 1260 and 1625 nm.

8. The optical testing coexistence module of claim 1, wherein the testing wavelength range includes at least a 1650 nm wavelength.

9. The optical testing coexistence module of claim 1, wherein the testing wavelength range includes wavelengths between 1645 and 1655 nm.

10. The optical testing coexistence module of claim 1, wherein the optical distribution equipment comprises a router, the router being configured to receive optical signals within the transmission wavelength range and forward signals within the transmission wavelength range.

11. The optical testing coexistence module of claim 1, wherein the first optical component and the second optical component are included within a housing installed at a secondary optical cabinet within the optical network.

12. The optical testing coexistence module of claim 11, wherein the housing can be connected with optical fiber connectors, adapters, and patch cords, or through splicing.

13. A method of enabling optical time domain reflectometry (OTDR) testing in an optical network including a primary cabinet location and a plurality of secondary cabinet locations optically connected in series, each of the plurality of secondary cabinet locations optically connected to a respective upstream optical fiber and a respective downstream optical fiber, the method comprising:

installing, at each of the plurality of secondary cabinet locations, an optical testing coexistence module comprising:

a first optical component optically connected to an upstream optical fiber within the optical network, the first optical component including a first wavelength division component, the first wavelength division component configured for receipt of optical signals within a transmission wavelength range and a testing wavelength range that is outside of the transmission wavelength range, and separation of the optical signals onto:

a transmission optical path carrying the transmission wavelength range and optically connected to optical distribution equipment; and a bypass optical path carrying the testing wavelength range; and a second optical component optically connected to the optical distribution equipment to receive the transmission wavelength range via a transmission fiber connection from the optical distribution equipment and the testing wavelength range via the bypass optical path, the second optical component recombining the received optical signals in the transmission wavelength range and the testing wavelength range onto a common downstream optical fiber;

injecting, at the primary cabinet location, an OTDR signal onto the single fiber; and based on reflected optical signals, identifying locations within the optical network experiencing transmission loss.

14. The method of claim 13, wherein the first wavelength division component and the second optical component comprise edge filters included within a module housing of the optical testing coexistence module.

15. The method of claim 13, wherein the second optical component comprises a combiner, wherein the combiner can receive optical signals within the testing wavelength range that is outside of the transmission wavelength range from the optical distribution equipment via the transmission fiber connection or via the bypass optical path.

16. The method of claim 13, wherein the testing wavelength range includes at least a testing wavelength of 1650 nm.

17. The method of claim 13, wherein the transmission wavelength range includes at least a pair of transmission wavelengths of 1310 and 1550 nm.

18. The method of any of claim 13, wherein the first optical component and the second optical component are included within a housing installed at a secondary optical cabinet within the optical network.

19. The method of claim 18, wherein the housing can be connected with optical fiber connectors, adapters, and patch cords, or through splicing.

20. An optical network comprising:

a primary optical distribution location; and a plurality of secondary optical distribution locations optically connected in series to the primary optical distribution location via a fiber connection structure, the fiber connection structure carrying optical signals in a transmission wavelength range and a testing wavelength range, wherein one or more of the plurality of secondary optical distribution locations includes:

optical distribution equipment; and an optical testing coexistence module comprising:

a first optical component optically connected to an upstream optical fiber within the optical network, the first optical component including a first wavelength division component, the first wavelength division component configured for receipt of optical signals within a transmission wavelength range and a testing wavelength range that is outside of the transmission wavelength range, and separation of the optical signals onto:

a transmission optical path carrying the transmission wavelength range and optically connected to optical distribution equipment; and a bypass optical path for carrying the testing wavelength range;

a second optical component optically connected to the optical distribution equipment to receive the transmission wavelength range via a transmission fiber connection from the optical distribution equipment and the testing wavelength range via the bypass optical path, the second optical component recombining the received optical signals in the transmission wavelength range and the testing wavelength range onto a common downstream optical fiber.

21. The optical network of claim 20, wherein each of the plurality of secondary optical distribution locations comprises a secondary optical cabinet.

22. The optical network of claim 21, wherein the optical distribution equipment comprises a router positioned within the secondary optical cabinet.

23. The optical network of claim 20, wherein the first wavelength division component and the second optical component comprise edge filters included within a module housing of the optical testing coexistence module.

24. The optical network of claim 20, wherein the second optical component comprises a combiner, wherein the combiner can receive optical signals within the testing wavelength range that is outside of the transmission wavelength range from the optical distribution equipment via the transmission fiber connection or via the bypass optical path.

25. The optical network of any of claim 20, wherein the first optical component and the second optical component are included within a housing installed at a secondary optical cabinet within the optical network.

26. The optical network of claim 25, wherein the housing can be connected with optical fiber connectors, adapters, and patch cords, or through splicing.

27. A method of enabling optical time domain reflectometry (OTDR) testing in an optical network including a primary cabinet location and a plurality of secondary cabinet locations optically connected in series, each of the plurality of secondary cabinet locations optically connected to a respective upstream optical fiber and a respective downstream optical fiber, the method comprising:

providing, at each of the plurality of secondary cabinet locations, an optical testing coexistence module comprising:

a first optical component optically connected to an upstream optical fiber within the optical network, the first optical component including a first wavelength division component, the first wavelength division component configured for receipt of optical signals within a transmission wavelength range and a testing wavelength range that is outside of the transmission wavelength range, and separation of the optical signals onto:

a transmission optical path carrying the transmission wavelength range and optically connected to optical distribution equipment; and a bypass optical path carrying the testing wavelength range; and a second optical component optically connected to the optical distribution equipment to receive the transmission wavelength range via a transmission fiber connection from the optical distribution equipment and the testing wavelength range via the bypass optical path, the second optical component recombining the received optical signals in the transmission wavelength range and the testing wavelength range onto a common downstream optical fiber;

injecting, at the primary cabinet location, a first OTDR signal onto the single fiber, or injecting, at the optical distribution equipment, a second OTDR signal onto the transmission fiber connection; and based on reflected OTDR optical signals, identifying locations within the optical network experiencing transmission loss.

28. The method of claim 27, wherein the first wavelength division component and the second optical component comprise edge filters included within a module housing of the optical testing coexistence module.

29. The method of claim 27, wherein the second optical component comprises a combiner, wherein the combiner can receive optical signals within the testing wavelength range that is outside of the transmission wavelength range from the optical distribution equipment via the transmission fiber connection or via the bypass optical path.

30. The method of claim 27, wherein the testing wavelength range includes at least a testing wavelength of 1650 nm.

31. The method of claim 27, wherein the transmission wavelength range includes at least a pair of transmission wavelengths of 1310 and 1550 nm.

32. The method of claim 27, wherein the first optical component and the second optical component are included within a housing installed at a secondary optical cabinet within the optical network.

33. The method of claim 32, wherein the housing can be connected with optical fiber connectors, adapters, and patch cords, or through splicing.

* * * * *